United States Patent
Holloway et al.

(10) Patent No.: US 9,902,321 B2
(45) Date of Patent: Feb. 27, 2018

(54) CONTROL SYSTEM, VEHICLE AND METHOD

(71) Applicant: Jaguar Land Rover Limited, Coventry (GB)

(72) Inventors: Katy Holloway, Coventry (GB); Iain Suffield, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/787,712

(22) PCT Filed: May 1, 2014

(86) PCT No.: PCT/EP2014/058952
§ 371 (c)(1),
(2) Date: Oct. 28, 2015

(87) PCT Pub. No.: WO2014/177674
PCT Pub. Date: Nov. 6, 2014

(65) Prior Publication Data
US 2016/0068101 A1    Mar. 10, 2016

(30) Foreign Application Priority Data

May 1, 2013    (GB) .................................. 1307864.7
May 1, 2013    (GB) .................................. 1307865.4

(51) Int. Cl.
*B60Q 5/00*    (2006.01)
*G10K 15/02*    (2006.01)
(Continued)

(52) U.S. Cl.
CPC ................ *B60Q 5/008* (2013.01); *B60L 3/12* (2013.01); *B60Q 5/005* (2013.01); *B60Q 9/00* (2013.01); *G10K 15/02* (2013.01)

(58) Field of Classification Search
CPC . G10K 15/02; B60W 2510/081; B60Q 5/008; A63H 17/34
See application file for complete search history.

(56) References Cited

U.S. PATENT DOCUMENTS 5,343,970 A * 9/1994 Severinsky ............ B60K 6/387
                                                     180/165
5,635,903 A    6/1997 Koike et al.
(Continued)

FOREIGN PATENT DOCUMENTS

DE    197 01 801 A1    7/1998
DE    102005012463 B3 *  6/2006 ............. G10K 15/02
(Continued)

OTHER PUBLICATIONS

Notification of Transmittal of the International Search Report and the Written Opinion of the International Searching Authority, or the Declaration, dated Jul. 14, 2014, 14 pages.
(Continued)

*Primary Examiner* — Behrang Badii
*Assistant Examiner* — David A Testardi
(74) *Attorney, Agent, or Firm* — Myers Bigel, P.A.

(57) ABSTRACT

An apparatus (145) for a vehicle (100) having an electric propulsion motor (123), the apparatus (145) being operable to generate an audible sound wherein at least one characteristic of the sound is dependent on a state of the vehicle (100).

9 Claims, 5 Drawing Sheets

(51) Int. Cl.
*B60Q 9/00* (2006.01)
*B60L 3/12* (2006.01)

(56) References Cited

U.S. PATENT DOCUMENTS

| | | | | |
|---|---|---|---|---|
| 6,209,672 B1* | 4/2001 | Severinsky | ............ | B60K 6/442 180/65.23 |
| 6,356,185 B1* | 3/2002 | Plugge | .................... | G10H 1/00 340/384.3 |
| 7,203,321 B1* | 4/2007 | Freymann | ................ | B60Q 5/00 381/61 |
| 2005/0113168 A1* | 5/2005 | Maeda | ................... | G10K 15/02 463/35 |
| 2006/0177797 A1* | 8/2006 | Costello | ................... | G09B 9/02 434/29 |
| 2006/0215846 A1* | 9/2006 | Kobayashi | ............ | G10K 15/02 381/61 |
| 2008/0310642 A1* | 12/2008 | Sakamoto | ............ | G10K 15/02 381/61 |
| 2010/0089307 A1* | 4/2010 | Kenchington | ......... | G10K 15/02 116/28 R |
| 2011/0087403 A1* | 4/2011 | Fujikawa | ............... | G10K 15/02 701/36 |
| 2011/0241868 A1* | 10/2011 | Iwamoto | ............... | B60Q 5/008 340/463 |
| 2012/0101611 A1* | 4/2012 | Inoue | .................... | G10K 15/02 700/94 |
| 2012/0242467 A1 | 9/2012 | Fujii | | |
| 2012/0275612 A1* | 11/2012 | Vogel | .................... | G10K 15/02 381/61 |
| 2012/0293318 A1 | 11/2012 | Saito et al. | | |
| 2013/0018537 A1 | 1/2013 | Arad | | |
| 2014/0016792 A1* | 1/2014 | Christoph | ............... | G10L 19/06 381/61 |
| 2014/0375443 A1* | 12/2014 | Aoyagi | ................. | G10K 15/02 340/425.5 |
| 2016/0059721 A1* | 3/2016 | Suffield | .................. | B60L 11/14 340/455 |

FOREIGN PATENT DOCUMENTS

| | | |
|---|---|---|
| DE | 10 2009 040 898 A1 | 3/2011 |
| DE | 10 2010 027 810 A1 | 10/2011 |
| DE | 10 2011 056 688 A1 | 6/2013 |
| EP | 1 367 560 A2 | 12/2003 |
| EP | 1 780 342 A2 | 5/2007 |
| EP | 2 565 082 A1 | 3/2013 |
| WO | WO 2010/146275 A2 * | 12/2010 |
| WO | WO 2012/016722 A2 * | 2/2012 |
| WO | WO 2012/101794 A1 * | 8/2012 |
| WO | WO 2013/017180 A1 | 2/2013 |

OTHER PUBLICATIONS

Combined Search and Examination Report, Application No. GB1307865.4, dated Oct. 24, 2013, 5 pages.
Combined Search and Examination Report, Application No. GB1307864.7, dated Oct. 22, 2013, 7 pages.

* cited by examiner

Frequency spectra of Electric motor sounds with SoC <20% (T1) and >20% (T2), at Full load, (P=1)

Frequency spectra of Electric motor sounds with SoC >20% at Full load (P=1) (T1) and at Zero load (P=0) (T2). Note fundamental frequencies (low harmonics) virtually unchanged, thus retaining sound character / harmonic structure, while higher frequencies are reduced at P=0, changing timbre.

CONTROL SYSTEM, VEHICLE AND METHOD

RELATED APPLICATIONS

This application is a 35 U.S.C. § 371 national stage application of PCT Application No. PCT/EP2014/058952, filed on May 1, 2014, which claims priority from Great Britain Patent Application No. 1307864.7, filed on May 1, 2013, and from Great Britain Patent Application No. 1307865.4, filed on May 1, 2013, the contents of which are incorporated herein by reference in their entireties. The above-referenced PCT International Application was published in the English language as International Publication No. WO 2014/177674 A1 on Nov. 6, 2014.

TECHNICAL FIELD

The present invention relates to apparatus for a motor vehicle, to a vehicle control system, a vehicle and to a method of controlling a vehicle. In particular but not exclusively, embodiments of the present invention relate to apparatus for a vehicle having an electric propulsion motor powered by charge from an energy storage device.

BACKGROUND

It is known to provide an electric vehicle, such as a plug in hybrid, having an electric propulsion motor and a battery for storing charge for powering the motor. The battery may be recharged by connecting the vehicle to a recharging facility.

It is an aim of the present invention to address disadvantages associated with the prior art and to provide an improved electric or hybrid electric vehicle.

SUMMARY OF THE INVENTION

Embodiments of the invention may be understood with reference to the appended claims.

Aspects of the present invention provide an apparatus, a vehicle and a method.

In one aspect of the invention for which protection is sought there is provided an apparatus for a vehicle having an electric propulsion motor, the apparatus being operable to receive a signal corresponding to a speed of rotation of the motor, the apparatus being configured to generate an audible sound wherein at least one characteristic of the sound is dependent on the signal corresponding to motor speed.

Embodiments of the present invention have the advantage that a user may be made aware of a speed at which the electric motor is rotating without having to look at an indicator of motor speed. It is to be understood that motor speed may be directly proportional to vehicle speed in embodiments in which a fixed gear ratio exists between a motor and one or more roadwheels. For example in some vehicles an electric propulsion motor may be mounted in a wheel hub and arranged directly to drive a corresponding wheel of the vehicle.

Some embodiments of the present invention have the advantage that a driver may be provided with reassurance that a propulsion motor is operating even if a driver cannot otherwise hear the motor, due to relatively silent operation thereof.

The apparatus may be operable to commence generation of the audible sound when a user signals starting of the vehicle.

Thus the audible sound may be generated even when the motor is not rotating, the sound subsequently changing in dependence on motor speed.

The user may signal starting of the vehicle by pressing a 'start' button in some embodiments although other arrangements are also useful.

Alternatively or in addition the apparatus may be operable to commence generation of the audible sound when a user selects a driving mode of the vehicle.

By driving mode is meant a mode or state in which the vehicle may be driven, such as a forward drive mode (typically placarded 'D' on an automatic transmission selector), or a reverse drive mode (typically placarded 'R' on an automatic transmission selector).

The apparatus may be configured wherein the at least one characteristic includes a timbre of the sound.

It is to be understood that by the term timbre is meant a form of a variation of amplitude of a sound as a function of frequency, as a function of time. It is to be understood that a timbre of the sound may be changed by changing the form of the spectrum of amplitude as a function of frequency. However, it is to be understood that timbre may be considered to be distinct from the volume or pitch of a sound. Thus, if the volume of a sound is increased, the timbre may remain substantially the same. That is, the relative amplitudes of different respective frequencies making up the sound may remain substantially the same, but the total volume may increase. Similarly, the pitch of a sound may be adjusted by introducing a change in the spectrum of amplitude as a function of frequency relative to a reference spectrum, whilst the timbre of the sound remains substantially unchanged.

In one embodiment, a product function is applied to the frequency spectrum in order to change a characteristic of the sound. Thus, the transformed spectrum corresponds to the original spectrum after application of a factor to each frequency component of the spectrum. For example in one embodiment frequency doubling (or tripling or some other multiple) may be applied to the original spectrum in which a factor of 2 (or 3 or some other multiple) is applied to each frequency component. Relative amplitudes of frequencies pre-doubling are therefore retained post-doubling, according to the product function.

In some embodiments the relative amplitudes may in addition or instead be modulated by filter means (for example an electrical, electronic or software-driven filter), changing the timbre of the sound. For example, lower frequencies may be more heavily attenuated than higher frequencies, in some embodiments.

The at least one characteristic may include a pitch of the audible sound.

The apparatus may be operable to increase a pitch of the sound with increasing motor speed.

This feature has the advantage that a change in the audible sound may be provided in response to which a user may intuitively perceive that motor speed has increased.

The apparatus may be configured wherein the sound is stored by the apparatus as an audio waveform.

The waveform may be stored as an audio file, for example as a way file, an mp3 file or in any other suitable format.

The apparatus may be operable to vary the pitch by varying a time period over which a prescribed amount of an audible sound file is replayed.

For example, an entire file may be replayed over a period of 10 s, 8 s, 6 s, 4 s or any other suitable time period, the time period being determined in dependence on motor speed.

The apparatus may be operable to vary a volume of sound generated by the apparatus as a function of motor speed.

The apparatus may be operable to increase the volume of sound generated with increasing motor speed.

The apparatus may be operable to vary at least one characteristic of the sound in dependence on whether a user has selected a boost mode in which operation of the propulsion motor at an increased power level is permitted.

The apparatus may be operable to generate the audible sound whereby the sound may be heard from outside the vehicle.

The apparatus may be operable to generate the audible sound by means of audio transducer means external to a cabin of the vehicle.

The apparatus may be operable to generate the audible sound whereby the sound may be heard from inside the vehicle.

The apparatus may be operable to generate the audible sound by means of audio transducer means internal to the cabin of the vehicle.

In one aspect of the invention for which protection is sought there is provided apparatus for a vehicle having an electric propulsion motor and energy storage means for powering the motor, the apparatus being operable to generate an audible sound wherein at least one characteristic of the sound is dependent on an amount of energy stored in the energy storage means.

Embodiments of the present invention have the advantage that a user may be made aware of the amount of energy stored in the energy storage means without having to look at an indicator of the amount of energy, such as a state of charge indicator or the like.

This feature has the advantage that it reduces driver workload whilst driving the vehicle.

The apparatus may be operable to commence generation of the audible sound when a user signals starting of the vehicle.

The user may signal starting of the vehicle by pressing a 'start' button in some embodiments although other arrangements are also useful.

The apparatus may be operable to commence generation of the audible sound when a user selects a driving mode of the vehicle.

By driving mode is meant a mode or state in which the vehicle may be driven, such as a forward drive mode (typically placarded 'D' on an automatic transmission selector), or a reverse drive mode (typically placarded 'R' on an automatic transmission selector).

The apparatus may be configured wherein the audible sound has a first form when the amount of energy stored in the energy storage means is less than a first critical value and a second form having at least one characteristic different from the first form when the amount of energy stored in the energy storage means is greater than the first critical value.

The first critical value may be any suitable value such as 10%, 15%, 20%, 25% or any other suitable value.

The apparatus may be configured wherein the audible sound has a third form when the amount of energy stored in the energy storage means is greater than a second critical value greater than the first.

It is to be understood that the apparatus may be arranged to generate audible sounds of different respective forms in dependence on whether the amount of energy stored in the energy storage means is between any adjacent pair of a plurality of respective critical values.

The apparatus may be arranged wherein the at least one characteristic includes a timbre of the sound.

It is to be understood that the by timbre is meant a form of a variation of amplitude of a sound as a function of frequency, as a function of time. It is to be understood that a timbre of the sound may be changed by changing the form of the spectrum of amplitude as a function of frequency.

It is to be understood that timbre may be considered to be distinct from the volume or pitch of a sound. Thus, if the volume of a sound is increased, the timbre may remain substantially the same. That is, the relative amplitudes of different respective frequencies making up the sound may remain substantially the same, but the total volume may increase. Similarly, the pitch of a sound may be adjusted by introducing a change in the spectrum of amplitude as a function of frequency relative to a reference spectrum, whilst the timbre of the sound remains substantially unchanged.

In one embodiment, a product function is applied to the frequency spectrum. Thus, the transformed spectrum corresponds to the original spectrum after application of a factor to each frequency component of the spectrum. For example in one embodiment frequency doubling (or tripling or some other multiple) may be applied to the original spectrum in which a factor of 2 (or 3 or some other multiple) is applied to each frequency component. Relative amplitudes of frequencies pre-doubling are therefore retained post-doubling, according to the product function.

In some embodiments the relative amplitudes may in addition or instead be modulated by filter means (for example an electrical, electronic or software-driven filter). For example, lower frequencies may be more heavily attenuated than higher frequencies, in some embodiments.

The apparatus may be arranged wherein the at least one characteristic does not include a volume or pitch of the audible sound.

The apparatus may be arranged wherein the first form corresponds to the second form after passage through a filter arranged to attenuate higher frequencies.

The higher frequencies may correspond to frequencies in excess of substantially 350 Hz.

The filter may be arranged substantially to eliminate frequencies in excess of one selected from amongst 500 Hz, 1 kHz, 2 kHz, 3 kHz and 4 kHz.

Thus, by the term higher frequencies may be meant frequencies in excess of 500 Hz, 1 kHz, 2 kHz, 3 kHz, 4 kHz or any other suitable value. Other arrangements are also useful.

The apparatus may be operable to vary the sound in dependence on a position of a user operated accelerator control.

The accelerator control may be a foot pedal, a hand operated device or any other suitable device for controlling an amount of drive torque developed by a powertrain of the vehicle.

The apparatus may be operable to vary the sound by blending between a plurality of respective sounds.

The apparatus may be operable to blend between the plurality of respective sounds by varying a relative volume of the respective sounds.

Thus, the volume of a first sound may be increased with changing accelerator control position in a first direction whilst the volume of a second sound is decreased.

The respective sounds may be stored by the apparatus as audio waveforms.

The waveforms may be stored as audio files, for example as way files, mp3 files or in any other suitable format.

The apparatus may be operable to vary the form of the audible sound in further dependence on a speed of travel of the vehicle.

The apparatus may be operable to vary a pitch of the sound in dependence on the speed of travel.

The apparatus may be operable to vary the pitch by varying a time period over which a prescribed amount of an audible sound file is replayed.

For example, an entire file may be replayed over a period of 10 s, 8 s, 6 s, 4 s or any other suitable time period, the time period being determined in dependence on the speed at which the vehicle is travelling.

The apparatus may be operable to vary a volume of sound generated by the apparatus as a function of vehicle speed.

The apparatus may be operable to increase the volume of sound generated with increasing vehicle speed.

The apparatus may be operable to vary at least one characteristic of the sound in dependence on whether a user has selected a boost mode in which operation of the propulsion motor at an increased power level is permitted.

The apparatus may be operable to generate the audible sound whereby the sound may be heard from outside the vehicle.

The apparatus may be operable to generate the audible sound by means of audio transducer means external to a cabin of the vehicle.

The apparatus may be operable to generate the audible sound whereby the sound may be heard from inside the vehicle.

The apparatus may be operable to generate the audible sound by means of audio transducer means internal to the cabin of the vehicle.

In a further aspect of the invention for which protection is sought there is provided a motor vehicle control system comprising apparatus according to the preceding aspect.

In one aspect of the invention for which protection is sought there is provided a motor vehicle comprising apparatus or a system according to a preceding embodiment.

The vehicle may be an electric vehicle. The electric vehicle may comprise energy storage means for powering the motor.

Alternatively the vehicle may be a hybrid vehicle. The hybrid vehicle may comprise energy storage means for powering the motor.

In a still further aspect of the invention for which protection is sought there is provided a method of controlling a vehicle having an electric propulsion motor and energy storage means for powering the motor, the method comprising receiving a signal corresponding to a speed of the motor, and generating an audible sound wherein at least one characteristic of the sound is dependent on the signal corresponding to motor speed.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying figures in which.

DETAILED DESCRIPTION

Figure 1:
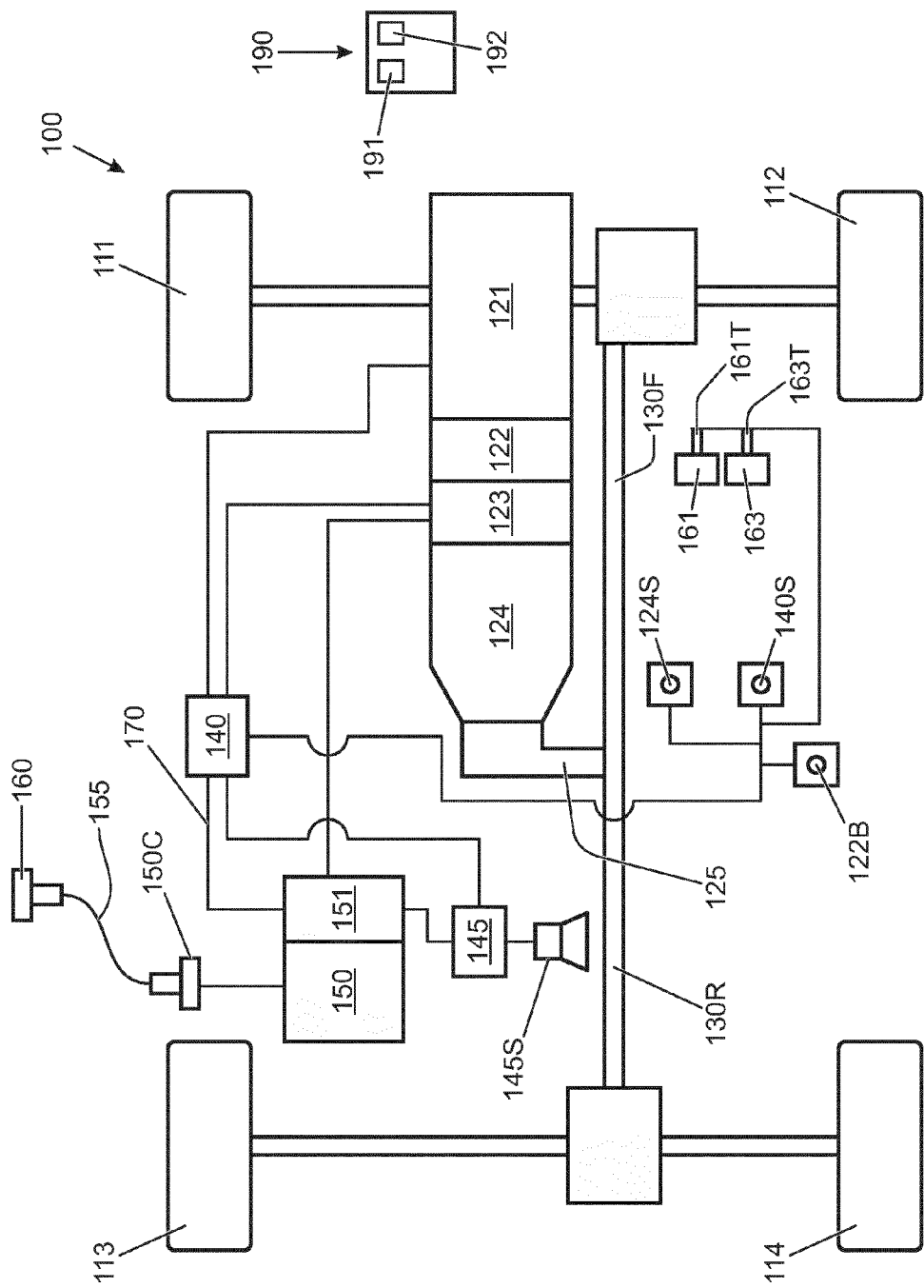
FIG. 1 is a schematic illustration of a hybrid electric vehicle according to an embodiment of the present invention.

FIG. 1 shows a hybrid electric vehicle (HEV) 100 according to an embodiment of the present invention. It is to be understood that embodiments of the present invention are also suitable for use with electric vehicles (EVs), being non-hybrid vehicles.

The vehicle 100 has an internal combustion engine 121 releasably coupled to a crankshaft integrated motor/generator (CIMG) 123 by means of a clutch 122. The CIMG 123 is in turn coupled to an automatic transmission 124. The automatic transmission 124 may be coupled to rear wheels 113, 114 of the vehicle 100 by means of a power transfer unit (PTU) 125 via a rear drive shaft 130R. The PTU 125 is also operable to couple the transmission 124 to front wheels 111, 112 of the vehicle 100 via a front drive shaft 130F.

A powertrain controller 140 is configured to control the engine 121, clutch 122 and CIMG 123 to provide drive torque to the transmission 124 by means of the engine 121 alone, the CIMG 123 alone or the engine 121 and CIMG 123 in parallel.

It is to be understood that in some embodiments the transmission 124 may be a manual transmission instead of an automatic transmission.

The vehicle 100 has a start button 140S and a driving mode selector dial 124S. The driving mode selector dial 124S is operable to control the transmission 124 to select a forward or reverse driving configuration.

A brake pedal 161 and an accelerator pedal 163 are provided for controlling vehicle speed. In the embodiment of FIG. 1, the powertrain controller 140 determines an amount by which the brake and accelerator pedals 161, 163 have been depressed by reference to respective pedal position transducers 161T, 163T. The controller 140 outputs a value of a parameter P which provides an indication of the position of the accelerator pedal 163. Parameter P has a value of substantially zero (P=0) if the pedal 163 is substantially undepressed. Parameter P has a value of 1 (P=1) if the pedal 163 is substantially fully depressed. Other arrangements are also useful.

A boost mode button 122B is provided, operable to select a boost mode of the vehicle 100 when pressed. The boost mode may also be referred to as a 'push to pass' mode. When selected, the boost mode allows the CIMG 123 to generate additional torque to drive the vehicle 100, necessitating a greater rate of drain of charge from the battery 150 than would normally be acceptable. The vehicle 100 is only permitted to operate in the boost mode for a prescribed period of time before the boost mode is cancelled automatically by the powertrain controller 140. Other arrangements are also useful.

The vehicle 100 has a battery 150 connected to an inverter 151 that generates a three-phase electrical supply that is supplied to the CIMG 123 when the CIMG 123 is operated as a motor. The battery 150 is arranged to receive charge from the CIMG 123 via the inverter 151 when the CIMG 123 is operated as a generator.

The battery 150 is also connected to a charging port 150C that is accessible from an exterior of the vehicle 100. The charging port 150C allows the battery 150 to be connected to a charging station 160 by means of a charging cable 155 to allow recharging of the battery 150. The vehicle 100 may therefore be described as a HEV of 'plug-in' type.

The powertrain controller 140 is configured to control operation of the vehicle 100 in an EV mode or hybrid mode. In EV mode, drive torque is provided by the CIMG 123 only. In the hybrid mode, drive torque may be provided in addition or instead by the engine 121.

The vehicle 100 has a vehicle control unit (VCU) 145 operable to place the vehicle in one of a plurality of power modes. The power modes include a 'parked' power mode (power mode 1, or 'PM1') in which the controller 140 is prevented from allowing the engine 121 or CIMG 123 to be operated unless a 'start' button 124S is pressed. The parked mode may be assumed only when the transmission 124 is in the park mode.

If a user exits the vehicle 100 and locks the vehicle, the VCU 145 is operable to place the vehicle in a 'parked and locked' condition in which vehicle systems are placed in a low power consumption mode. This mode is referred to as 'power mode 0' or PM0.

The VCU 145 is configured to check that each of four passenger doors and each of two rear payload doors (not shown) are closed before allowing the vehicle to assume mode PM0. Other checks may also be made before mode PM0 may be assumed. For example the VCU 145 may check that one or more controllers such as powertrain controller 140 have shut down before mode PM0 may be assumed.

A user may place the vehicle 100 in PM0 by means of a key fob 190. The fob 190 has first and second control buttons 191, 192. The first control button 191 is operable to unlock the vehicle 100 whilst the second control button 192 is operable to lock the vehicle 100.

With the vehicle is in mode PM0, if the VCU 145 detects that a user has pressed the first control button 191 of the fob 190, the VCU 145 is configured to control the vehicle 100 to assume power mode PM1 and unlock the doors of the vehicle 100. If the vehicle is in mode PM1 and the VCU 145 detects that a user has pressed the second control button 192 of the fob 190, the VCU 145 is configured to attempt to lock the doors. If the VCU 145 is able to lock the doors, the vehicle is subsequently controlled to assume mode PM0. If the VCU 145 is not able to lock the doors, the vehicle remains in mode PM1. In some embodiments, the VCU 145 may control the vehicle to assume mode PM0 from mode PM1 even if the doors are not locked, if the vehicle is stationary for more than a prescribed period of time.

With the vehicle in mode PM1, the VCU 145 monitors the start button 140S. If the user presses the start button 140S the VCU 145 assumes power mode PM2 and the vehicle 100 is made ready to be driven. The VCU 145 may perform one or more further operations, for example by displaying prescribed information on a HMI (human-machine interface) display.

In the embodiment of FIG. 1, the VCU 145 is configured such that if a user subsequently selects a driving mode by means of the driving mode selector 124S, the transmission 124 assumes a corresponding configuration whereby drive torque generated by the engine 121 and/or CIMG 123 is transmitted to the driven wheels.

The VCU 145 is operable to generate audible sound by means of an audio transducer 145S to provide audible feedback to the driver confirming that the vehicle is in mode PM2. The audible sound is generated by repeatedly playing back sound files which may also be described as sonic signatures. In some embodiments, a system other than the VCU 145 may perform this function. In the present embodiment the audio transducer 145S is in the form of a dynamic loudspeaker having a cone-shaped diaphragm and electromagnetic coil driver. Other forms of audio transducer such as contact transducers and bending wave radiators are also useful. Other audio transducers are also useful.

The VCU 145 stores three pairs of sound files for playback when the vehicle is in mode PM2. One pair of files is selected by the VCU 145 at any given moment in time. A first pair of files are selected (employed) when a state of charge of the battery 150 is less than or substantially equal to 20% of the normal allowable range of state of charge. A second pair of files are employed when the state of charge of the battery 150 exceeds 20%. A third pair of files are employed if a user selects operation of the vehicle 100 in the boost mode, by means of boost mode button 122B.

In use, the VCU 145 outputs a sound which is a blend of first and second files of the selected pair of files. The composition of the blend depends on the position of the accelerator pedal 163. If the accelerator pedal 163 is substantially undepressed, indicating that the driver is not demanding positive drive torque, the first file of the appropriate pair is played back at a first volume and the second file of the pair is played back at substantially zero volume. If the accelerator pedal 163 is fully depressed, the second file of the pair is played back at a second volume and the first file is played back at substantially zero volume. In the present embodiment the first and second volumes are substantially the same. In some alternative embodiments the second volume is greater than the first, although other arrangements are also useful.

For accelerator pedal positions intermediate the undepressed and fully depressed positions, the volume at which the first and second files are played back is blended in proportion to an amount by which the accelerator pedal 163 is advanced. Thus, the volume at which the first file is played back progressively decreases with advancing accelerator pedal position, whilst the volume at which the second file is played back progressively increases with advancing accelerator pedal position.

The first and second files are based on substantially the same sound file, however the first file differs from the second in that a timbre of the sound is different. The first file is generated by applying an attenuating filter to the second sound file to attenuate higher frequencies thereof. This results in a relatively bright, harsher sound when the accelerator pedal 163 is fully depressed, and a relatively dark, softer sound when the accelerator pedal 163 is substantially undepressed. Thus, the first file is essentially a filtered version of the second file.

The first and second pairs of sound files differ from one another also in respect of timbre. The first pair of sound files are generated by applying an attenuating filter to the second pair of sound files. In particular, in the present embodiment a 6 dB attenuation is applied to sounds below 350 Hz, and a 12 dB attenuation is applied to sounds above 350 Hz, with the exception of selected major harmonics.

Application of the attenuating filter in the manner described above results in first and second sound files (forming the first pair of sound files) that produce a more smooth, more closed and more relaxed impression on a user than the corresponding sounds of the second pair of sound files. Thus the first pair of files are intended to provide a user with an indication of tiredness, reflecting the relatively low state of charge of the battery 150. Other methods of modifying the second pair of files to produce the first pair are also useful. In some alternative embodiments the files of the first pair may be derived substantially independently of the second pair.

Figure 2:
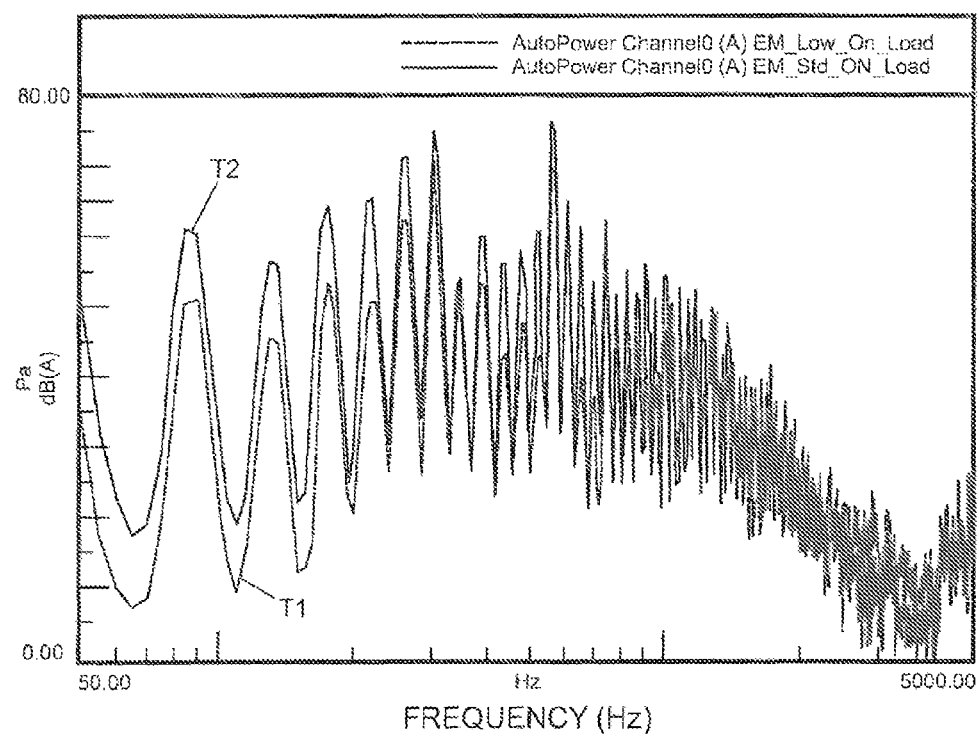
FIG. 2 shows frequency spectra of audio sound generated by apparatus according to an embodiment of the present invention for different states of charge with a fully depressed accelerator pedal control.

FIG. 2 illustrates sound pressure level output by transducer 145S as a function of frequency with accelerator pedal 163 substantially fully depressed (P=1) in the situation where the battery SOC is less than 20% (trace T1) and the situation where the battery SOC is greater than 20% (trace T2). Thus, traces T1 and T2 correspond to the second sound files of the first and second pairs, respectively. It can be seen that traces T1 and T2 have a similar variation in sound pressure level as a function of frequency, whilst the signal corresponding to trace T1 is more heavily attenuated than that corresponding to trace T2, at least for sound levels below around 2 kHz.

Figure 3:
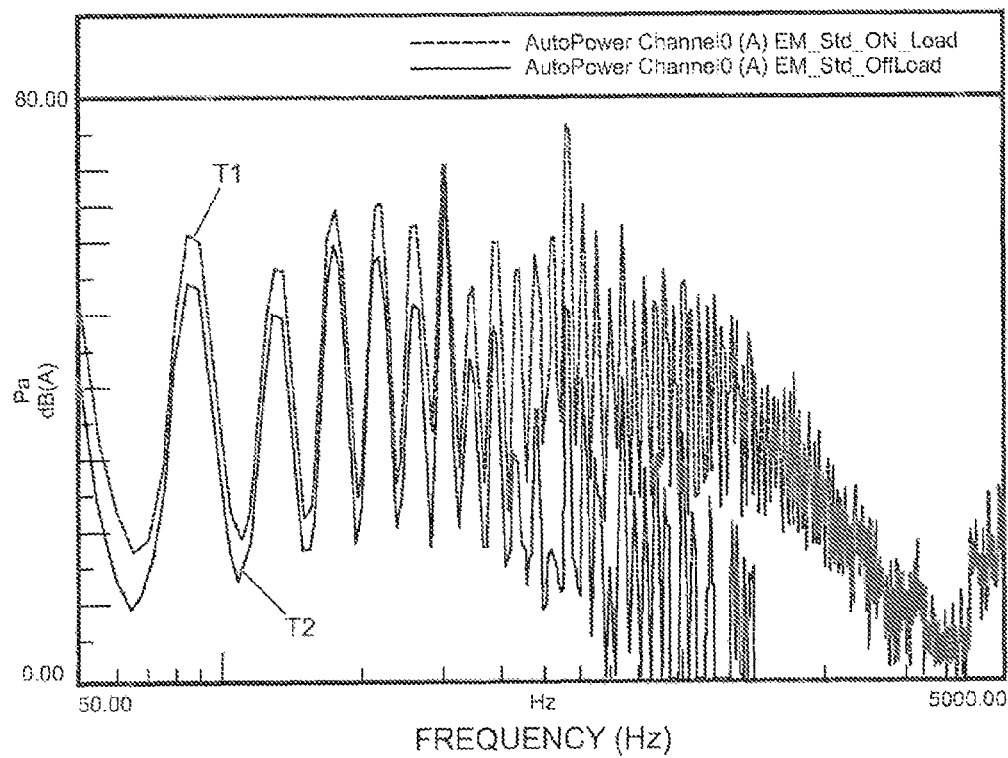
FIG. 3 shows frequency spectra of audio sound generated by apparatus according to an embodiment of the present invention for a battery state of charge exceeding 20% for different accelerator pedal control positions.

FIG. 3 illustrates sound pressure level output by transducer 145S as a function of frequency with battery SOC greater than 20% with the accelerator pedal 161 fully depressed (P=1) (trace T1) and fully released (P=0) (trace T2). Trace T1 therefore corresponds to trace T2 of FIG. 2. It can be seen that trace T1 is similar to trace T2 in the lower frequency range illustrated, i.e. the fundamental frequencies (low harmonics) are substantially unchanged. Higher frequencies, however, are reduced for trace T2, changing the timbre of the sound.

The third pair of files are intended to provide a user with an impression of an aggressive mode, and have more high frequency content than the second pair of files. In the present embodiment the sound is generated by simulating playback of the second pair of files through an over-driven amplifier. Thus, the sound is distorted, and has a sense of being brighter and more 'crunchy' than the second pair. Other arrangements are also useful.

Figure 4:
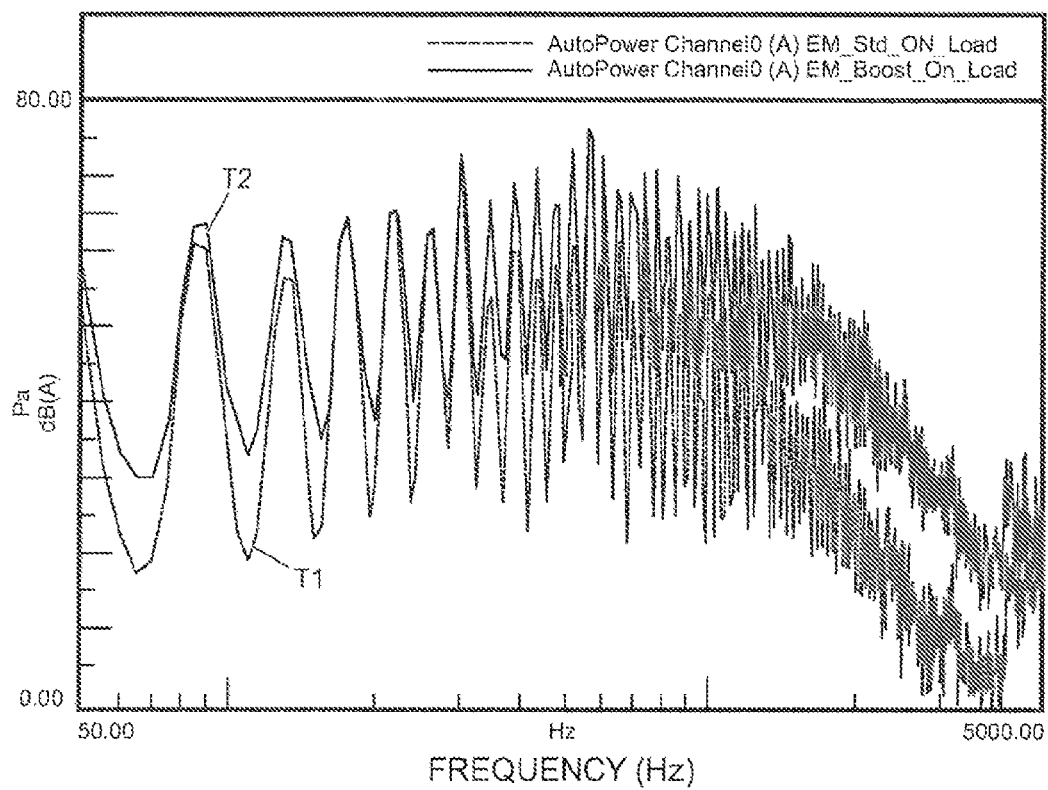
FIG. 4 shows frequency spectra of audio sound generated by apparatus according to an embodiment of the present invention for a battery state of charge exceeding 20% and a fully depressed accelerator pedal control, with and without boost mode selected.

FIG. 4 illustrates sound pressure level output by transducer 145S as a function of frequency with accelerator pedal 163 substantially fully depressed (P=1) in the situation where the battery SOC is greater than 20% and the vehicle 100 is not operating with the boost mode selected (trace T1) and the situation where the vehicle 100 is operating with a similar battery SOC but with the boost mode selected (trace T2).

Thus, traces T1 and T2 correspond to the second sound files of the second and third pairs of sound files, respectively. That is, trace T1 of FIG. 4 corresponds to trace T2 of FIG. 2. It can be seen that traces T1 and T2 have a similar variation in sound pressure level as a function of frequency, whilst the signal corresponding to trace T1 is more heavily attenuated than that corresponding to trace T2.

In some alternative embodiments the files of the third pair may be derived substantially independently of the second pair. Other arrangements are also useful.

The VCU 145, in addition to monitoring battery state of charge and accelerator pedal position, also monitors vehicle road speed and speed of rotation of the CIMG 123.

The VCU 145 is configured repeatedly to play back a blended combination of the first and second files of the first, second or third pair, each playback of the files being completed in a prescribed period of time T which is referred to as the playback period. Thus the playback period is the period of time within which the sound defined by the first and second files is played back from the start of each file to the end of each file in the appropriate blended combination.

In one embodiment according to the invention, the VCU 145 adjusts the playback period T according to the speed at which the CIMG 123 is rotating. The faster the CIMG 123 is rotating, the shorter the selected playback period. This has the effect that as the speed of rotation of the CIMG 123 increases, a pitch of the sound that is played back increases. This provides a helpful, intuitive feedback to the driver in respect of the speed of the CIMG 123. Thus, if the vehicle 100 is stationary the playback period T is set to a value T0. As CIMG speed increases, the value of T is reduced according to a prescribed functional relationship. The relationship may be linear as in the present embodiment, and in direct proportion to CIMG speed, or any other suitable relationship.

Alternatively, or in addition, the VCU 145 may adjust the playback period T according to the speed at which the vehicle 100 is travelling. The faster the vehicle 100 is travelling, the shorter the selected playback period. This has the effect that as the speed of the vehicle 100 increases, a pitch of the sound that is played back increases. This provides a helpful, intuitive feedback to the driver in respect of the speed of the vehicle. Thus, if the vehicle 100 is stationary the playback period T may be set to a value T0. As vehicle speed increases, the value of T may be reduced according to a prescribed functional relationship. The relationship may be linear, and in direct proportion to vehicle speed, or any other suitable relationship.

The VCU 145 is provided with data in respect of battery state of charge, accelerator pedal position P, speed of rotation of the CIMG 123 and vehicle speed by means of data transmitted on a controller area network (CAN) bus 170 by one or more other controllers such as the powertrain controller 140.

In the embodiment of FIG. 1 the road speed corresponds to the speed of the wheels 111-114, which in turn correspond to an output speed of the transmission (corrected if necessary according to a selected gear ratio of the PTU 125, such as a high or low gear ratio). In some embodiments, the VCU 145 may calculate vehicle road speed by reference to a speed of the CIMG 123 and a selected gear of the transmission 124 at a given moment in time. Conversely, the VCU 145 may in some embodiments calculate CIMG speed by reference to vehicle road speed and the selected gear of the transmission 124.

In some embodiments, when operating in EV mode with the engine 121 switched off, the transmission may be configured to remain in a prescribed gear, for example third gear. In this case, road speed will be directly proportional to motor speed and in the same proportion as long as the transmission 124 remains in the same gear. It is to be understood that the vehicle may operate in a driver selected EV-only mode or a hybrid electric vehicle (HEV) mode. In the driver selected EV-only mode engine starting is prohibited unless driver torque demand exceeds a prescribed value or battery state of charge falls below a prescribed minimum value. That is, the vehicle 100 attempts to remain in EV mode as long as possible, whereby drive torque is provided by means of the CIMG 123 only. Other arrangements are also useful.

In the present embodiment, when operating in the HEV mode the powertrain controller 140 is caused to start and stop the engine 121 according to a prescribed HEV control methodology, and not necessarily only when battery state of charge falls below the prescribed minimum value. Again, other arrangements are also useful.

In some embodiments the VCU 145 may be configured to vary the playback period according to motor speed alone, regardless of vehicle road speed. Thus in the case where the motor drives an input of a transmission, the playback period may vary with selected transmission gear. Other arrangements are also useful.

In some embodiments, the sounds described above are only generated when the vehicle 100 is operating in the electric vehicle or hybrid electric vehicle modes. It may be that the sounds described above are generated at any time when the vehicle 100 is operating in the driver selected EV mode, regardless of whether the CIMG 123 is generating drive torque, and when in the HEV mode and the CIMG 123 is generating drive torque. This feature has the advantage that a user is made aware of the fact that the CIMG 123 is operating, even when the vehicle 100 is operating in the hybrid mode with the engine 121 switched on. In the absence of any other indication that the CIMG 123 is operating as a propulsion motor when the vehicle 100 is in the hybrid mode, it may be difficult for the user to appreciate that the CIMG 123 is in fact operating and providing torque assist to the engine 121 due to quietness of operation of the CIMG 123.

In some embodiments, the VCU 145 may be configured to generate the audible sound by means of the speaker 145S only when the CIMG 123 is in fact generating drive torque, regardless of vehicle operating mode. Alternatively, the VCU 145 may be configured to generate the sound whenever the vehicle is operating in the driver-selected EV mode or in HEV mode provided the engine 121 is switched off. In some embodiments the VCU 145 may be configured to generate the sound when the vehicle 100 is in HEV mode regardless of whether the engine is switched on or off. Other arrangements are also useful.

Figure 5:
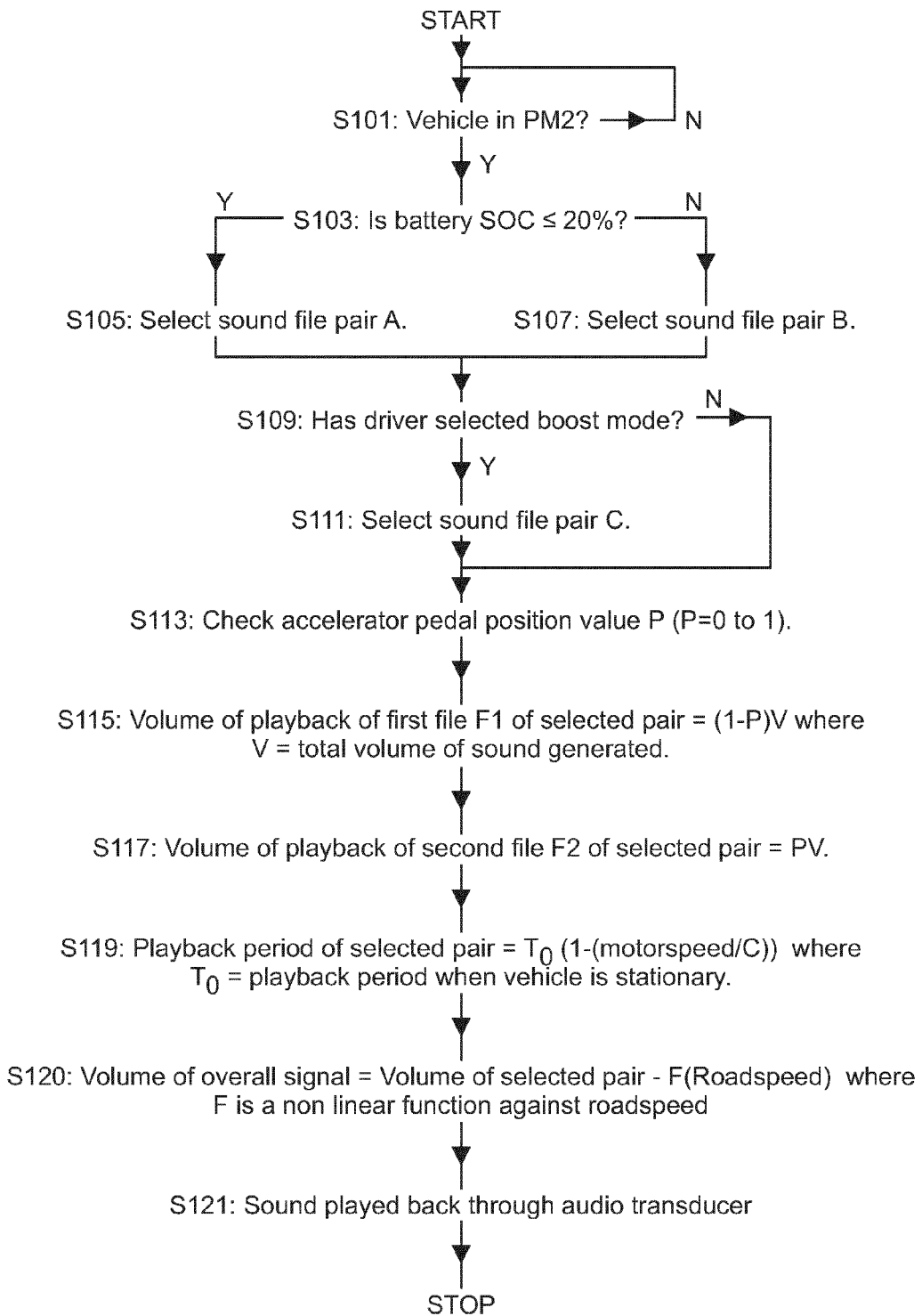
FIG. 5 is a flow chart illustrating a method according to an embodiment of the present invention.

FIG. 5 is a flow diagram illustrating a manner in which the VCU 145 controls the audible sound generated via the audio transducer 145S when the vehicle is in mode PM2.

At step S101 the VCU 145 determines whether the vehicle 100 is in mode PM2. If the vehicle is in mode PM2 the VCU 145 continues at step S103.

At step S103 the VCU 145 determines whether the SOC of the battery 150 is less than or substantially equal to 20%. If the SOC is less than or equal to 20% the VCU 145 continues at step S105, else the VCU 145 continues at step S107.

At step S105 the VCU 145 selects sound file pair A for playback whereas at step S107 the VCU 145 selects sound file pair B. Sound file pairs A and B differ from one another in that respective first and second files of pair B have more high frequency content than the corresponding first and second files of pair A as described above. Pair A are arranged such that first and second files thereof are smoother, more closed and more relaxed than the corresponding first and second files of pair B. In each case the first file of a given pair corresponds to the second file of that pair, but subject to an attenuating filter in which higher frequencies are attenuated in the manner described above.

At step S109 the VCU 145 determines whether the driver (or user) has selected a boost mode. If the driver has not selected the boost mode the VCU 145 continues at step S113. If the driver has selected the boost mode the VCU 145 continues at step S111. At step S111 the VCU 145 selects sound file pair C instead of pair A or B (selected at steps S105 or S107). The VCU 145 then continues at step S113.

At step S113 the VCU 145 checks the value of accelerator pedal position parameter P, which is broadcast on the CAN bus by powertrain controller 140.

At step S115 the VCU 145 determines the volume at which the first sound file F1 is to be played back. The volume at which file F1 is to be played back is determined by multiplying the total sound volume to be generated, V, by (1-P).

At step S117 the VCU 145 determines the volume at which the second sound file F2 is to be played back. The volume at which file F2 is to be played back is determined by multiplying the total sound volume to be generated, V, by P.

It is to be understood that in some embodiments the total sound volume V may be a function of P, the volume V increasing with P. The increase in V may be linear, non-linear or a combination of linear and non-linear over different respective ranges of P. In some embodiments, in addition or instead the total sound volume V may be a function of vehicle speed, the total volume V increasing with speed.

At step S119 the VCU 145 determines the playback period T of the selected pair of sounds by reference to the current speed of rotation of the CIMG 123, also referred to herein as motor speed. In the present embodiment, the playback period T is determined by multiplying a reference period T0 by [1−(motor speed/C)], where C is a constant. The value of C is chosen to provide a suitable reduction in playback period T below T0 such that at a maximum speed of operation of the CIMG 123 the playback speed is not too short or too long. Suitable values of C may be determined empirically by the skilled person, but may for example be substantially equal to double or triple the value of maximum CIMG speed.

In some alternative embodiments, the period T may have a more complex dependency on CIMG speed. For example the dependency may be non-linear over one or more ranges. The dependency may be linear but with different rates of reduction in T as a function of CIMG speed, in dependence on the value of road speed. Other arrangements are also useful.

In some embodiments the value of C may correspond to a saturation motor speed above which the playback period T is not shortened any further, but rather remains at a minimum saturation value Ts. The VCU 145 may be configured to suspend reducing the playback period below Ts if motor speed increases above the saturation motor speed.

Alternatively, at step S119 the VCU 145 may determine the playback period T of the selected pair of sounds by reference to the current road speed of the vehicle 100. In such an embodiment, the playback period T is determined by multiplying a reference period T0 by [1−(road speed/C)], where C is a constant. The value of C is chosen to provide a suitable reduction in playback period T below T0 such that at a maximum speed of the vehicle 100 the playback speed is not too short or too long. Again, suitable values of C may be determined empirically by the skilled person. In one embodiment the value of C corresponds to a double or triple the value of maximum possible road speed of the vehicle. Other values are also useful.

In some alternative embodiments, the period T may have a more complex dependency on road speed. For example the dependency may be non-linear over one or more ranges. The dependency may be linear but with different rates of reduction in T as a function of road speed, in dependence on the value of road speed. Other arrangements are also useful.

In some embodiments the value of C may correspond to a saturation road speed Vs above which the playback period T is not shortened any further, and remains at a minimum saturation value Ts. The VCU 145 may be configured to suspend reducing the playback period below Ts if speed increases above Vs.

At step S121 the VCU 145 plays back the appropriate blended combination of file pairs A, B or C with the appropriate playback period determined at step S119.

In the present embodiment, an additional function is implemented in which vehicle roadspeed is monitored and a playback volume of the sound adjusted accordingly. The playback sound may be increased with increasing roadspeed.

Thus, in some embodiments the VCU 145 is configured to increase the playback volume with increasing roadspeed. This feature has the advantage that the sound can still be heard in spite of the presence of the masking effects of wind and road noise.

The functionality may be implemented by a multi-point control loop whereby attenuation at specific control points in respect of speed are defined. Thus in some embodiments, at a speed of substantially 0 kph a volume of the sound is attenuated by (say) −10 dB with respect to a nominal volume, at 10 kph it is attenuated by (say) −5 dB, and at 200 kph it is not attenuated (corresponding to an attenuation of 0 dB) with respect to the nominal volume. At roadspeeds between specified control points, the volume of the sound is interpolated linearly between the attenuations of the respective control points. Other values of attenuation and other values of roadspeed at which a change in volume is effected (by means of a change in attenuation) are also useful.

Embodiments of the present invention have the advantage that a user may be made aware of the speed of rotation of an electric propulsion motor of the vehicle by means of an audible sound in an intuitive and non-distracting manner. This feature provides a driver with helpful feedback that the motor is operating, and of how fast the motor is operating.

Embodiments of the present invention have the advantage that a user may be made aware of the state of charge of a motor vehicle by means of an audible sound in an intuitive and non-distracting manner. This reduces driver workload since the driver is not required to inspect a visual indicator in order to determine battery state of charge. The audible sound may be chosen depending on whether the battery state of charge is above or below 20% or other suitable value.

Furthermore, some embodiments of the present invention provide a motor vehicle having an audible sound that varies with pedal position parameter P, and which may vary with road speed, to provide the driver with intuitive feedback in respect of the amount by which the accelerator pedal 163 is depressed and the speed the vehicle is traveling at. Providing an audible indication of the amount by which the accelerator pedal 163 is depressed may provide reassurance to the driver that the VCU 145 has registered a change in torque demand by the driver, in the case that the driver releases or depresses the accelerator pedal 163. In some embodiments of the invention the sound is generated whenever the vehicle is in a driving mode, for example whenever the vehicle is in a mode in which depression of the accelerator pedal will result in application of torque to one or more wheels to propel the vehicle. Other arrangements are also useful.

Embodiments of the present invention may be understood by reference to the following numbered paragraphs:

1. An apparatus for a vehicle having an electric propulsion motor, the apparatus being operable to generate an audible sound wherein at least one characteristic of the sound is dependent on a state of the vehicle.

2. An apparatus according to paragraph 1, the apparatus being operable to receive a signal corresponding to a speed of rotation of the motor and to generate an audible sound wherein at least one characteristic of the sound is dependent on said signal.

3. An apparatus according to paragraph 1, the apparatus having an energy storage device for powering the motor, the apparatus being operable to generate an audible sound wherein at least one characteristic of the sound is dependent on an amount of energy stored in the energy storage device.

4. An apparatus according to paragraph 3 configured wherein the audible sound has a first form when the amount of energy stored in the energy storage device is less than a first critical value and a second form having at least one characteristic different from the first form when the amount of energy stored in the energy storage device is greater than the first critical value.

5. An apparatus according to paragraph 4 configured wherein the audible sound has a third form when the amount of energy stored in the energy storage device is greater than a second critical value greater than the first.

6. An apparatus according to any preceding numbered paragraph operable to commence generation of the audible sound when a user signals starting of the vehicle.

7. An apparatus according to any preceding numbered paragraph operable to commence generation of the audible sound when a user selects a driving mode of the vehicle.

8. An apparatus according to any preceding numbered paragraph wherein the at least one characteristic includes a timbre of the sound.

9. An apparatus according to any preceding numbered paragraph wherein the at least one characteristic includes a pitch of the audible sound.

10. An apparatus according to numbered paragraph 9 as dependent upon numbered paragraph 2 operable to increase a pitch of the sound with increasing motor speed.

11. An apparatus according to any preceding numbered paragraph wherein the sound is stored by the apparatus as an audio waveform.

12. An apparatus according to numbered paragraph 11 as dependent on numbered paragraph 10 operable to vary the pitch by varying a time period over which a prescribed amount of an audible sound file is replayed.

13. An apparatus according to any preceding numbered paragraph wherein the at least one characteristic does not include a volume or pitch of the audible sound.

14. An apparatus according to numbered paragraph 4 or any one of numbered paragraphs 5 to 13 depending through numbered paragraph 4 wherein the first form corresponds to the second form after passage through a filter arranged to attenuate higher frequencies.

15. An apparatus according to numbered paragraph 14 wherein the higher frequencies correspond to frequencies in excess of substantially 350 Hz.

16. An apparatus according to numbered paragraph 14 or numbered paragraph 15 wherein the filter is arranged substantially to eliminate frequencies in excess of one selected from amongst 500 Hz, 1 kHz, 2 kHz, 3 kHz and 4 kHz.

17. An apparatus according to any preceding numbered paragraph operable to vary the sound in dependence on a position of a user operated accelerator control.

18. An apparatus according to numbered paragraph 17 operable to vary the sound by blending between a plurality of respective sounds.

19. An apparatus according to numbered paragraph 18 operable to blend between the plurality of respective sounds by varying a relative volume of the respective sounds.

20. An apparatus according to any preceding numbered paragraph operable to vary the form of the audible sound in further dependence on a speed of travel of the vehicle.

21. An apparatus according to numbered paragraph 19 operable to vary a pitch of the sound in dependence on the speed of travel.

22. An apparatus according to any preceding numbered paragraph operable to vary a volume of sound generated by the apparatus as a function of vehicle speed.

23. An apparatus according to numbered paragraph 18 operable to increase the volume of sound generated with increasing vehicle speed.

24. An apparatus according to any preceding numbered paragraph operable to vary a volume of sound generated by the apparatus as a function of motor speed.

25. An apparatus according to numbered paragraph 22 operable to increase the volume of sound generated with increasing motor speed.

26. An apparatus according to any preceding numbered paragraph operable to vary at least one characteristic of the sound in dependence on whether a user has selected a boost mode in which operation of the propulsion motor at an increased power level is permitted.

27. An apparatus according to any preceding numbered paragraph operable to generate the audible sound whereby the sound may be heard from outside the vehicle.

28. An apparatus according to any preceding numbered paragraph operable to generate the audible sound by means of an audio transducer external to a cabin of the vehicle.

29. An apparatus according to any preceding numbered paragraph operable to generate the audible sound whereby the sound may be heard from inside the vehicle.

30. An apparatus according to any preceding numbered paragraph operable to generate the audible sound by means of an audio transducer internal to the cabin of the vehicle.

31. A motor vehicle control system comprising apparatus according to any preceding numbered paragraph.

32. A motor vehicle comprising apparatus according to any one of numbered paragraphs 1 to 30 or a system according to numbered paragraph 31.

33. A vehicle according to numbered paragraph 32 wherein the vehicle is an electric vehicle.

34. A vehicle according to numbered paragraph 32 wherein the vehicle is a hybrid vehicle.

35. A method of controlling a vehicle having an electric propulsion motor, the method comprising receiving a signal corresponding to a speed of the motor, and generating an audible sound wherein at least one characteristic of the sound is dependent on the signal corresponding to motor speed.

36. A method of controlling a vehicle having an electric propulsion motor and energy storage device for powering the motor, the method comprising generating an audible sound wherein at least one characteristic of the sound is dependent on an amount of energy stored in the energy storage device.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus for a vehicle having an electric propulsion motor, the apparatus configured to:
   store first and second sound files corresponding to respective first and second sounds, wherein the first sound file is a filtered version of the second sound file;
   receive a signal corresponding to a speed of rotation of the motor; and
   generate an audible sound via an audio transducer, wherein at least one characteristic of the audible sound is dependent on said signal, and wherein the audible sound is generated via the audio transducer using a blend of the first and second sound files.

2. The apparatus according to claim 1, wherein the first sound file is generated by applying an attenuating filter to the second sound file to attenuate higher frequencies of the second sound file.

3. The apparatus according to claim 1, further configured to commence generation of the audible sound via the audio transducer when a user starts the vehicle and/or when a user selects a forward or reverse driving configuration of the vehicle via a driving mode selector.

4. The apparatus according to claim 1, wherein the at least one characteristic includes a timbre of the audible sound and/or a pitch of the audible sound.

5. The apparatus according to claim 1, further configured to vary a volume of the audible sound generated by the audio transducer as a function of the speed of rotation of the motor.

6. A motor vehicle comprising the apparatus of claim 1, wherein the vehicle is an electric vehicle or a hybrid vehicle.

7. The apparatus according to claim 1, wherein the first sound file differs from the second sound file in its timbre.

8. The apparatus according to claim 1, wherein a composition of the blend depends on a position of an accelerator pedal.

9. A method of controlling a vehicle having an electric propulsion motor, the method comprising:
   storing first and second sound files corresponding to respective first and second sounds, wherein the first sound file is a filtered version of the second sound file;
   receiving a signal corresponding to a speed of rotation of the motor; and
   generating an audible sound via an audio transducer, wherein at least one characteristic of the audible sound is dependent on the signal corresponding to the speed of rotation of the motor, and wherein the audible sound is generated via the audio transducer using a blend of the first and second sound files.

* * * * *